United States Patent [19]

Reichmann

[11] Patent Number: 5,447,980
[45] Date of Patent: Sep. 5, 1995

[54] STABILIZED POLYAMIDE FIBER

[75] Inventor: Mark G. Reichmann, Roswell, Ga.

[73] Assignee: Amoco Corporation, Chicago, Ill.

[21] Appl. No.: 122,367

[22] Filed: Sep. 16, 1993

[51] Int. Cl.⁶ ............................................. C08K 3/10
[52] U.S. Cl. ................................... 524/413; 524/401
[58] Field of Search ........................... 524/401, 413; 252/400.53

[56] References Cited

U.S. PATENT DOCUMENTS

| | | |
|---|---|---|
| 3,457,325 | 7/1969 | Anton . |
| 3,491,042 | 1/1970 | Hermann ............................ 524/413 |
| 3,629,174 | 12/1971 | Siclari et al. ....................... 524/413 |
| 3,639,335 | 2/1972 | Fujii et al. . |
| 4,346,194 | 8/1982 | Roura .................................. 525/66 |
| 4,362,846 | 12/1982 | Korber et al. ...................... 525/66 |
| 4,537,929 | 8/1985 | Nagrani .............................. 525/66 |
| 4,594,386 | 6/1986 | Olivier ................................ 525/66 |
| 4,937,276 | 6/1990 | Niclinger et al. ................. 524/136 |
| 5,006,601 | 4/1991 | Lutz et al. .......................... 525/66 |
| 5,106,946 | 4/1992 | Clark et al. ....................... 528/335 |
| 5,157,064 | 10/1992 | Gijsman .............................. 524/413 |

FOREIGN PATENT DOCUMENTS 3114259 6/1988

*Primary Examiner*—Kriellion S. Morgan
*Attorney, Agent, or Firm*—Richard J. Schlott; Stephen L. Hensley

[57] ABSTRACT

Polyamide filaments stabilized with a copper-containing stabilizer and a polyolefin synergist exhibit substantially improved dry heat stability. The filaments withstand processing at elevated temperatures and are particularly useful in applications where extended exposure to elevated temperatures in air is contemplated.

6 Claims, No Drawings

STABILIZED POLYAMIDE FIBER

BACKGROUND OF THE INVENTION

This invention relates to polyamide yarns, and more particularly to heat-stabilized polyamide yarn and filament, and to a composition and method for improving the dry heat stability of polyamide filament and yarn.

Polyamides generally exhibit a balance of thermal, strength and stiffness properties which make them suitable for many applications, and may be particularly attractive for use where resistance to chemical and thermal attack is required. Aliphatic polyamides, termed nylons, generally are readily processed thermally and have gained wide acceptance in the molding arts and in the extrusion arts, including fiber spinning and film extrusion. Many such polyamides find use in the form of yarn as tire cord and other applications where high tenacity and low shrinkage are needed. Aromatic polyamides and copolyamides have also been developed for use where high temperature properties are desired, and crystalline and semi-crystalline copolyamides comprising at least about 50 mole percent aliphatic terephthalamide units are known for their particularly good thermal properties. However, such polyamides have relatively high melting points e.g., about 290° C. or higher, and degradation temperatures of some of the materials do not greatly exceed their melting points; accordingly, requirements for melt processing these polyamides are more rigorous and complex than those for polyamides such as nylon 66, melting at about 260°–265° C.

Yarn and filament are generally produced by melt spinning, in processes such as are disclosed and described in U.S. Pat. No. 5,106,946. Melt spinning operations subject the resin to severe stress through application of high shear at high temperatures, and good thermal stability is therefore critically important to attaining good fiber properties. In addition, many fiber processes subject the fiber to drawing operations at elevated temperatures to develop crystallinity in the fiber, and such processing steps may expose the yarn to dry heat for extended periods. Finally, filament and yarn for use in many industrial fiber applications such as drier felts and the like must be capable of withstanding extended exposure to elevated temperature environments.

The art of stabilizing resins against deterioration through exposure to thermal oxidative environments is well developed. Numerous additives have been proposed for improving the thermal oxidative resistance of polyamides, both during processing and while in use. For example, the short-term thermal stability needed for most processing may be realized by employing polyamide formulations comprising hindered phenolic antioxidants such as di-tertiary butyl cresol and derivatives. It also is important for industrial yarn applications and similar uses where the yarn will undergo extended exposure to oxidative environments that the additives retain their effectiveness after processing. Stabilizer compositions comprising copper (I) halide, and an alkali metal halide are described in the art for use with polyamides, and the use of complex compounds comprising copper salts and diamines has also been disclosed for use with polyamide filaments. See U.S. Pat. No. 3,639,335. Dispersions of solid cuprous phthalate and potassium iodide have been used at levels corresponding to ca. 60 ppm copper to stabilize nylon 6,6 filaments comprising nylon 6,6 and copolymers comprising minor amounts of hexamethylene isophthalamide, as shown in U.S. Pat. No. 3,457,325. Inasmuch as the copper component of these stabilizers is a solid, the stabilizers will be employed at low levels, and will be thoroughly dispersed in the resin to minimize loss in fiber strength. Heat stabilizers comprising combinations of copper halides, alkali metal halides and phosphorus compounds have been employed for use in polyamide molding resins and the like, as shown for example in U.S. Pat. No. 4,937,276.

High temperature polyamides require processing at temperatures very near the decomposition temperature, and achieving adequate stabilization in these resins is more difficult than for aliphatic nylons, particularly where use in the production of filaments and yarn is contemplated. Generally such forms have a very high surface per unit weight, and thus will have far higher exposure to thermal oxidative attack than encountered in the production of molded articles, extruded profile goods, laminates or the like. Inasmuch as quite high processing temperatures are necessary to melt-spin filaments from high temperature polyphthalamides, these effects will be exacerbated. In addition, some stabilizers form gaseous products that may cause flaws and weaken the filament. For example, copper compounds are known to be particularly active as polymer decarboxylating agents and, during melt extrusion and in melt-spinning operations, can cause substantial bubble formation. Though such bubbles are extremely small in size and would go unnoticed in molded articles, filaments generally have a very small cross-section, frequently on the order of the size of the bubbles, and the presence of the bubbles then becomes of great significance, forming flaws that weaken the individual filaments and cause filament breakage.

The art thus continues to seek stabilizing formulations for polyamides, and particularly for high temperature polyamides such as polyphthalamides that will afford improved thermal stability in processing and particularly in melt spinning, as well as improve the ability of high temperature polyamide filaments to resist thermal oxidative degradation when subjected to elevated temperature environments during use.

BRIEF SUMMARY OF THE INVENTION

This invention is directed to compositions comprising a polyamide, a copper-containing stabilizer, and a synergist. More particularly, the invention is directed to stabilized polyamide filaments comprising a high temperature polyamide, a copper-containing stabilizer composition and a polyolefin synergist, and to a composition for use in stabilizing high temperature polyamide filament, said composition comprising a copper-containing stabilizer and a functionalized polyolefin synergist. The invention further contemplates methods for stabilizing polyamides, and more particularly a method for stabilizing a melt-spun high temperature polyamide filament comprising compounding the polyamide with a copper-containing stabilizer and a functionalized polyolefin synergist prior to melt-spinning.

Polyphthalamides are particularly resistant to moisture and chemical attack and, when stabilized according to the teachings of this invention, the filament and yarn may be particularly useful where extended exposure to heat is contemplated. The filament and yarn may be particularly useful in the construction of clothing for press felts and drier felts are employed in the construction and operation of papermaking machines or the like, and may also find application as the felting fiber in such uses.

DETAILED DESCRIPTION OF THE INVENTION

The stabilized yarns and filament of this invention comprise a polyamide, a copper-containing stabilizer and a synergist.

The polyamides useful as yarn and filament according to the teachings of the invention will include the various linear, fiber-forming thermoplastic polyamide homopolymers and copolymers known and widely used in the-art in the manufacture of fiber and filaments. Particularly suitable are the high temperature polyphthalamides and aromatic-aliphatic copolymer analogs thereof, frequently termed aromatic nylons, that require high processing temperatures and are thus difficult to melt process without deterioration. Particularly preferred as aromatic nylons are the crystalline or semicrystalline high temperature copolyamides comprising terephthalamides of aliphatic diamines and at least one additional diamide of an aliphatic diamine. The aliphatic diamine component of the copolyamide may be one or more acyclic or cycloaliphatic $C_2$–$C_{12}$ aliphatic diamines such as hexamethylene diamine or the like, including such diamines having one or more $C_1$–$C_4$ alkyl substituents attached to the hydrocarbon portion thereof. The diamide component forming the units of additional diamide will be selected from aromatic diamides such as an isophthalamide, a naphthalene dicarboxylic acid diamide or the like, and $C_4$–$C_{12}$ acyclic or cycloaliphatic carboxylic diamides such as adipamide, sebacamide, cyclohexane dicarboxylic acid diamide or the like. The well-known, melt-processable thermoplastic polyamides such as the aliphatic polyamides commonly termed nylons, including polycaproamide or nylon 6, polyhexamethylene adipamide or nylon 6,6 and the like, may also be stabilized according to the invention.

Although the molecular weight of the polyamide is not particularly important to the stabilization, for the purposes of fiber and filament use generally, fiber grade polyamides will be best suited for the purposes of this invention. Such resins may be further described as having inherent viscosities greater than about 0.7, preferably greater than about 0.8, when measured at 30° C. in a 60/40 phenol/tetrachloroethylene (TCE) mixture at a concentration of 0.4 g/dl. Although there is no particular upper limit for molecular weight to be suitable for use in these compositions, very high molecular weight polyphthalamides, those with an inherent viscosity as great as 2.0 or even greater, may be extremely difficult to process thermally in a melt spinning operation, and hence will not be preferred.

Polyamides generally regarded as preferred for use in filament and fiber are crystalline or crystallizable. A variety of polyphthalamides comprising terephthalamide units are known in the art for these purposes, and copolyphthalamides comprising a combination of hexamethylene terephthalamide units and hexamethylene adipamide units, optionally including hexamethylene isophthalamide units are also well-known for use in fiber applications. Particularly desirable for the purposes of the invention are copolyphthalamides comprising at least 50 mole % hexamethylene terephthalamide units the balance being hexamethylene adipamide units or a mixture thereof with up to about 30 mole % hexamethylene isophthalamide units. Also useful are the well known crystallizable polyphthalamides comprising 2-methyl-1,5-pentamethylene terephthalamide units. A variety of copolyphthalamides including those described herein as preferred are readily available from commercial sources. Suitable polyphthalamide resins and methods for their preparation are also fully described in the art, for example, in U.S. Pat. Nos. 4,603,166 and 4,831,108, 5,112,685 and 4,163,101 and in European Patent Application 309,095; the teachings of these patents and applications are hereby incorporated herein by reference.

The copper-containing stabilizers useful in the practice of the invention may be further characterized as comprising a copper compound soluble in the polyamide and an alkali metal halide. More particularly, the stabilizer will consist essentially of a copper (I) salt, for example cuprous acetate, cuprous stearate, a cuprous organic complex compound such as copper acetylacetonate, a cuprous halide or the like, and an alkali metal halide. Preferably, the stabilizer will consist essentially of a copper halide selected from copper iodide and copper bromide and the alkali metal halide will preferably be selected from the iodides and bromides of lithium, sodium and potassium. The formulations comprising copper (I) halide, an alkali metal halide and a phosphorus compound have also been employed to improve the stability of injection-molded, filled polyphthalamide plaques during extended storage at temperatures up to about 140° C., as disclosed in U.S. Pat. No. 4,937,276.

The amount of the stabilizer will generally be sufficient to provide a level of from about 50 to about 1000 ppm copper. The stabilizer will preferably comprise a copper (I) halide and an alkali metal halide at a weight ratio the range of from about 2.5 to about 10, and most preferably from about 8 to about 10. Generally, the combined weight of copper compound and alkali metal halide in the stabilized polyamide filament will amount to from about 0.01 to about 2.5 wt %, preferably from about 0.1 to about 1.5 wt %, based on the combined weight of polyamide, stabilizer and synergist.

Copper-containing stabilizers such as combinations of cuprous halide and alkali metal halide are known for use in stabilizing aliphatic polyamides. However, these stabilizers do not adequately stabilize polyamides for use in the production of filament and fiber, and particularly those requiring high temperature processing such as polyphthalamides. The further addition of a synergist is thus necessary in order to obtain thermally-stable polyamide filaments, particularly filaments from polyphthalamides, that are suitable for processing and use at elevated temperatures. The synergists found useful for these purposes are polyolefins. Polyolefins such as polyethylene and polypropylene, as well as ethylene-propylene copolymers and alpha-olefin terpolymers with diene comonomers or the like may be useful as synergists. However, most polyolefins have limited compatibility with polyamides and do not disperse readily, and thus may adversely affect filament properties. Functionalized polyolefins such as the carboxyl-modified polyolefins obtained, for example, by grafting a polyolefin with a suitable carboxylic compound such as acrylic or methacrylic acid, a carboxylic acid anhydride such as maleic acid, an acid amide such as acrylamide or the like in the presence of a peroxide compound are generally more compatible with polyamides, dispersing readily and forming stable blends having excellent properties. Such functionalized polyolefins are therefore preferred synergists for use with copper stabilizing compounds for stabilizing polyamide filaments in the practice of this invention.

The functionalized polyolefin synergists may comprise as little as 0.01 wt % carboxyl functionality, more preferably from about 0.1 to as great as 5 wt % or greater carboxyl functionality. The molecular weight of the modified polyolefin does not appear to be particularly critical in synergizing the stabilizing action; the functionalized polyolefins that may be useful include those having a melt index in the range of about 0.5 to about 200 g/10 min. Suitable polyolefins are well known and widely available to the trade from commercial sources, including the maleated polypropylenes and ethylene-propylene copolymers supplied as Hercoprime G from Himont Corporation, the Exxelor PO series of additives from Exxon Chemical Company, as well as the acrylic acid-grafted polypropylenes and maleated polyethylenes and polypropylenes sold under the Polybond label by BP Polymers, Inc., the acrylate-modified polyethylenes obtainable under the Surlyn label from the DuPont Company and from Dow Chemical Company under the Primacor label, and the maleated stryrene-butadiene and SEBS block copolymers obtainable under Kraton label from Shell Chemical Company. The amount of carboxyl-modified polyolefin additive employed will be a quantity sufficient to synergistically enhance the stabilizing activity of the copper-containing stabilizer. Generally the synergist will comprise from about 1 to about 20 wt %, preferably from about 2 to about 15 wt % and still more preferably from about 2 to about 10 wt % of the composition based on combined weight of polyamide, synergist and stabilizer. Lower levels are generally ineffective, while at levels above about 20 wt % the effect does not further improve, and the added polyolefin tends to affect overall physical properties, and particularly modulus.

The invented compositions may also be formed into fibers, film, sheets or other forms using any of a variety of processes and methods well known and widely practiced in the fabricating arts, e.g. melt spinning of fibers, melt-extrusion of sheets or films, or used as matrix materials or binders for composite or laminated structures.

The present invention is described further in connection with the following examples, it being understood that the same are for purposes of illustration and not limitation.

EXAMPLES

The following materials and formulations are employed in the Examples.

Polyphthalamide I: Hexamethylene terephthalamide-adipamide-isophthalamide terpolymer, mole ratio 65/10/25, inherent viscosity of 0.95 dl/g determined at 30° C. in a 60/40 phenol/TCE mixture at a concentration of 0.4 g/dl, obtained as Amodel®1001 polyphthalamide resin from Amoco Performance Products, Inc.

Modified Polyolefins:

The modified polyolefins employed in the examples and their description, according to the technical information supplied by the vendor, include:

Primacor 1410 XT: Acrylic acid-modified polyethylene, obtained from Dow Chemical Company, 9.5% functionality, 1.5 melt index.

Surlyn 9920: Methacrylic acid-modified polyethylene, obtained from the DuPont Company, low functionality, 5.5 melt index.

Polybond 3009: Maleic anhydride-modified polyethylene, obtained from the BP Company, ca. 1% functionality, 3–6 melt index.

Royaltuf 465: Maleic anhydride-modified EPDM polymer, obtained from Uniroyal Company, 1% functionality, low melt index.

Kraton FG1901X: Maleic anhydride-modified SEBS block polymer obtained from Shell Chemical Company, ca. 2% functionality.

Test Procedures

Tensile testing of film and fiber was carried out according to standard ASTM test procedures.

The methods of the following Examples are representative of those that may be employed for preparing the resin formulations and melt spun yarns according to the practice of this invention. The processes will be generally recognized by those skilled in the art as processes and methods commonly employed for the production of yarn and filament. The specimens of commercial resins used as controls were prepared and tested using substantially the same processes and conditions employed for the examples according to the invention; the test results may vary from published data for commercial materials processed in different equipment under other processing conditions.

Examples 1–10. The formulations are summarized in Table I. Dry blends of Polyphthalamide I together with the indicated amounts of copper iodide/potassium iodide stabilizer and Royaltuf 465 maleic anhydride-EPDM synergist were extrusion compounded and melt-spun using a 1 inch, single-screw extruder fitted with a medium compression ratio screw and a four-hole die with 2.8 mm diameter holes. The extruder zone temperatures during the extrusion ranged generally from 300° to about 325° C., with a melt temperature of about 325° C. and a die temperature of 310° C. The throughput was 54 cc/min. The four filaments were drawn in three stages using air oven temperatures of 360° F., 410° F. and 460° F., giving a draw ratio of 4.08. The final filament diameters were about 0.6 mm.

Control Examples A–F. Filaments comprising formulations omitting one or more of the stabilizer or synergist components were similarly prepared and tested to provide controls for comparison purposes.

Thermal stabilities of the filaments of Examples 1–10 and Control Examples A–F were determined by tensile testing of fiber samples after aging in an air oven at 350° F. for periods of from 1 to 28 days. The compositions and test data are summarized in Table I.

TABLE I

350° F. Heat Stability of Filaments Comprising Polyphthalamide, CuI/KI Stabilizer and Functionalized EPDM Synergist

| Ex. No. | EPDM wt % | Cu ppm | KI/Cu ratio | Initial T g/den | E % | % Tenacity retained, days | | | | | |
|---|---|---|---|---|---|---|---|---|---|---|---|
| | | | | | | 1 | 2 | 4 | 7 | 14 | 21 | 28 |
| Contr. A | 0 | 0 | 0 | 4.6 | 25 | 40 | 24 | 0 | 0 | | | |
| Contr. B | 0 | 50 | 10 | 3.7 | 28 | — | 0 | | | | | |

TABLE I-continued

350° F. Heat Stability of Filaments Comprising
Polyphthalamide, CuI/KI Stabilizer and Functionalized EPDM Synergist

| Ex. No. | EPDM wt % | Cu ppm | KI/Cu ratio | Initial T g/den | E % | % Tenacity retained, days | | | | | |
|---|---|---|---|---|---|---|---|---|---|---|---|
| | | | | | | 1 | 2 | 4 | 7 | 14 | 21 | 28 |
| Contr. C | 0 | 100 | 10 | 3.8 | 33 | — | 0 | | | | | |
| Contr. D | 0 | 300 | 10 | * | | (not run) | | | | | | |
| Contr. E | 0 | 500 | 10 | * | | (not run) | | | | | | |
| Contr. F | 5 | 0 | 0 | 3.2 | 36 | 40 | 24 | 0 | | | | |
| 1 | 5 | 110 | 8.9 | 2.8 | 30 | 102 | 85 | 66 | 0 | | | |
| 2 | 5 | 280 | 10.6 | 3.3 | 35 | 91 | 108 | 85 | 79 | 49 | ** | |
| 3 | 5 | 297 | 10 | 3.1 | 31 | 98 | 110 | 88 | 90 | 41 | ** | |
| 4 | 5 | 416 | 11.3 | 3.0 | 31 | 105 | 114 | 102 | 92 | 61 | 28 | 0 |
| 5 | 10 | 112 | 9.4 | 3.2 | 34 | 79 | 65 | 53 | 35 | *** | | |
| 6 | 10 | 302 | 9.5 | 3.1 | 33 | 84 | 96 | 80 | 67 | 37 | ** | |
| 7 | 10 | 327 | 10.5 | 3.1 | 37 | 90 | 98 | 83 | 79 | 0 | | |
| 8 | 10 | 498 | 8.4 | 3 | 33 | 98 | 98 | 90 | 92 | 59 | ** | |
| 9 | 5 | 269 | 3.7 | 3.2 | 31 | 96 | 102 | 77 | 29 | *** | | |
| 10 | 10 | 301 | 4.9 | 2.7 | 32 | 95 | 96 | 83 | 74 | 0 | | |

Notes:
* = severe bubble formation - filaments could not be extruded without breaking;
** = 0% retention at 17 days;
*** = 0% retention at 10 days.

It will be apparent from these data that copper stabilizers alone are ineffective in stabilizing polyphthalamides during melt extrusion. Formulations with low levels of Cu (Controls B and C) are less stable than the neat resin (Control A), undergoing nearly complete loss in tenacity within 2 days. Severe bubble formation and brittleness occurs at levels above 100 ppm Cu (Control D and Control E). Compositions with EPDM alone (Control F) also undergo unacceptable degradation, retaining only about 20% of the tenacity in two days of aging.

The combination of the copper stabilizer and the polyolefin synergist affords substantial improvement in thermal stability over the controls, as shown by the data for Examples 1-10. The mechanical properties of the filament may be significantly affected by the presence of the stabilizer formulation. See the tensile data for Examples 5-9, and for the neat filament, Comparative Example A. Generally it will be desirable to employ only the amount of stabilizer and synergist necessary to obtain the desired degree of stabilization in order to minimize the affect on mechanical properties, and synergist levels below about 10 wt % will thus be preferred for many uses.

Control Example G. A dry blend of pellets of Polyphthalamide I and 0.58 wt % hindered phenolic stabilizer obtained as Irganox 1098 from Ciba Geigy Company was melt spun substantially following the procedures of Examples 1-10. The resulting filament had a tenacity of 4.9 g/denier and an elongation of 28%. The filament was aged following the procedures outlined in Examples 1-10, giving 88% tenacity retention after 2 days, 60% after 4 days, 37% after 7 days and 0% after 9 days.

Control Example H. A dry blend of pellets of Polyphthalamide having an I.V of 0.83 dl/g and 0.5 wt % hindered phenolic stabilizer obtained as Irganox 1098 from Ciba Geigy Company was melt spun using a single-screw, two inch extruder fitted with a Sterlex IV double flight/barrier screw having an L/D ratio of 30, at extruder set temperatures of 330° C. and 340° C. The exit was fitted with a mesh screen pack and a spin pack including a 144-hole spinnarette. The fiber was continuously drawn in two stages at 150° C. and a draw ratio of 3.5/1, to give a 70 filament 830 denier stabilized polyphthalamide yarn.

Control Example I. The procedures of Control G were substantially followed to provide an unstabilized yarn from the same 0.83 I.V. polyphthalamide, for comparison purposes.

The yarns were exposed to dry heat at 160° C. (320° F.) in a circulating air oven. Samples were removed periodically for tenacity testing. The stabilized yarn of Control Example G retained 100% tenacity after 20 hours, 89% after 50 hours, and 60% after 120 hours at 320° F. The unstabilized yarn of Control Example H retained only 84% tenacity after 20 hours, 28% after 50 hours and 0% after 120 hours at 320° F.

It will be apparent that the formulations comprising a copper stabilizer and a polyolefin synergist are significantly more effective in improving the dry heat stability of polyphthalamide filament and yarn than the hindered phenolic stabilizers heretofore employed in the art for the purpose.

Examples 11–15. Additional formulations comprising the polyamide, stabilizer and synergist were melt spun as before. The air gap distance was 12 inches, and the oven temperatures and godet speeds were: godet 1—32 ft/min.; 1st oven—360° F.; godet 2—122 ft/min; 2nd oven—410° F.; godet 3—130 ft/min; 3rd oven—460° F.; and godet 4—112 ft/min.

The results are summarized in Table II.

TABLE II

350° F. Heat Stability of Filaments Comprising
Polyphthalamide with KI/CuI (10/1) Stabilizer at 500 ppm Cu
and Functionalized Olefin Synergist

| Ex. No. | Synergist[1] | wt % | Initial T g/den | % Tenacity retained, days | | | | |
|---|---|---|---|---|---|---|---|---|
| | | | | 4 | 7 | 11 | 14 | 17 | 21 |
| 11 | Kraton FG1901X | 7.5 | 4.0 | 90 | 85 | 65 | 59 | 35 | 31 |
| 12 | Royaltuf 465 | 7.5 | 3.2 | 82 | 63 | 38 | 28 | 0 | 0 |
| 13 | Primacor 1410 XT | 3.8 | 3.8 | 77 | 65 | 59 | 49 | 43 | 34 |
| 14 | Polybond 3009 | 3.8 | 3.4 | 85 | 80 | 63 | 74 | 55 | 43 |
| 15 | Surlyn 9920 | 3.8 | 3.2 | 103 | 101 | 91 | 78 | 59 | 59 |

Notes:
[1]For synergist descriptions see modified polyolefins, listed above.

It will be apparent that modified polyethylene, Examples 13, 14 and 15, and modified SEBS copolymer, Example 11, are also effective synergists, and are generally more effective than the modified EPDM employed in the stabilized formulations of Examples 1–10 and 12.

Addition of the synergist was also effective to improve the green strength or melt integrity of the filaments during extrusion. For formulations without synergist the first godet speed could not be reduced below about 40 ft/min, while the above formulations were able to be processed using a first godet speed of 32 ft/min. This is particularly surprising in view of the effect of synergist on tensile properties noted for Examples 5–9. Slub formation was also reduced, with the modified SEBS found to be substantially more effective in reducing slubs and providing a smooth filament than the modified olefins and modified EPDM.

The invention will thus be seen to be a stabilized yarn or filament comprising a polyamide, a copper-containing stabilizer and a synergist. More particularly, the invention is a stabilized polyamide filament or yarn comprising a polyphthalamide, a copper-containing stabilizer composition and a modified polyolefin synergist, and a composition for use in stabilizing polyphthalamide filament comprising a copper-containing stabilizer and a functionalized polyolefin synergist.

Although the invention has been described and illustrated by way of specific embodiments set forth herein, still further modifications and variations will be readily apparent to those skilled in the resin formulating and composite fabricating art. For example, melt extrusion of thin film, particularly film intended for use in the form of slit film as staple fiber in forming yarn, tow or woven textile or the like, is subject to many of the same considerations as the melt spinning of filament, including thermal degradation and loss of strength through bubble formation, and the stabilizing compositions may find use in such application. These and other such variations and modifications are also contemplated as lying within the scope of the invention, which will be solely defined by the appended claims.

I claim:

1. A stabilized polyamide filament comprising a polyamide, a mixture of potassium iodide and Copper (I) iodide in a KI/CuI weight ratio of from about 2.5 to about 10 and in an amount sufficient to provide a level of from about 50 to about 1000 ppm copper, and from 1 to about 20 wt % of a polyolefin synergist selected from the group consisting of functionalized polyethylene, functionalized polypropylene, functionalized SEBS polymer and functionalized ethylene-propylene-diene monomer terpolymer.

2. The stabilized filament of claim 1 wherein the polyamide is a polyphthalamide.

3. A composition adapted for use in stabilizing polyphthalamide filament, said composition comprising a mixture of potassium iodide and copper (I) iodide in a KI/CuI weight ratio of from about 2.5 to about 10 and a polyolefin synergist comprising at least one functionalized polyolefin selected from the group consisting of functionalized polyethylene, functionalized polypropylene, functionalized SEBS polymer and functionalized ethylene-propylene-diene monomer terpolymer.

4. A method for stabilizing a melt-spun polyphthalamide filament comprising compounding said polyphthalamide with a copper-containing stabilizer comprising a mixture of potassium iodide and copper (I) iodide in a KI/CuI weight ratio of from about 2.5 to about 10 and a synergist comprising at least one functionalized polyolefin prior to melt-spinning.

5. The method of claim 4 wherein said functionalized polyolefin is selected from the group consisting of functionalized polyethylene, functionalized polypropylene, functionalized SEBS polymer and functionalized ethylene-propylene-diene monomer terpolymer.

6. The method of claim 4 wherein a sufficient amount of said stabilizer composition is compounded with the polyphthalamide to provide a copper level of from about 50 to about 1000 ppm, based on total stabilized formulation.

* * * * *